(12) United States Patent
Horie

(10) Patent No.: US 7,159,004 B2
(45) Date of Patent: Jan. 2, 2007

(54) ADDER, MULTIPLIER AND INTEGRATED CIRCUIT

(75) Inventor: Kimito Horie, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 640 days.

(21) Appl. No.: 10/648,373

(22) Filed: Aug. 27, 2003

(65) Prior Publication Data

US 2005/0076074 A1    Apr. 7, 2005

(30) Foreign Application Priority Data

Aug. 27, 2002    (JP)    ............... 2002-246629

(51) Int. Cl.
*G06F 7/50*    (2006.01)
(52) U.S. Cl. ................... 708/714; 708/620
(58) Field of Classification Search ............. 708/714
See application file for complete search history.

(56) References Cited

U.S. PATENT DOCUMENTS

| | | | |
|---|---|---|---|
| 4,675,837 A * | 6/1987 | Ulbrich et al. ............... | 708/714 |
| 4,707,800 A * | 11/1987 | Montrone et al. .......... | 708/714 |
| 5,027,311 A * | 6/1991 | Zion .......................... | 708/714 |
| 5,337,269 A | 8/1994 | McMahan et al. | |
| 5,581,497 A | 12/1996 | Kumar | |
| 5,875,123 A | 2/1999 | Dao Trong et al. | |
| 5,898,596 A | 4/1999 | Ruetz | |
| 6,199,091 B1 | 3/2001 | Kobayashi et al. | |

\* cited by examiner

*Primary Examiner*—Tan V. Mai
(74) *Attorney, Agent, or Firm*—Rabin & Berdo P.C.

(57) ABSTRACT

An adder includes a first XOR element for generating an XOR output of the first and the second data inputs, a first multiplexer for selecting one of the first carry input or the first data input while the XOR output is made a selection signal, a second multiplexer for selecting one of the second carry input or the second data input, a third multiplexer for selecting one of the first or the second carry inputs while the carry selection input is made a selection signal, and a second XOR element for generating an XOR output of an output of the third multiplexer and the XOR output, and is characterized in that an output of the first multiplexer is made a first carry output, an output of the second multiplexer is made a second carry output, and an output of the third multiplexer is made an addition value.

9 Claims, 9 Drawing Sheets

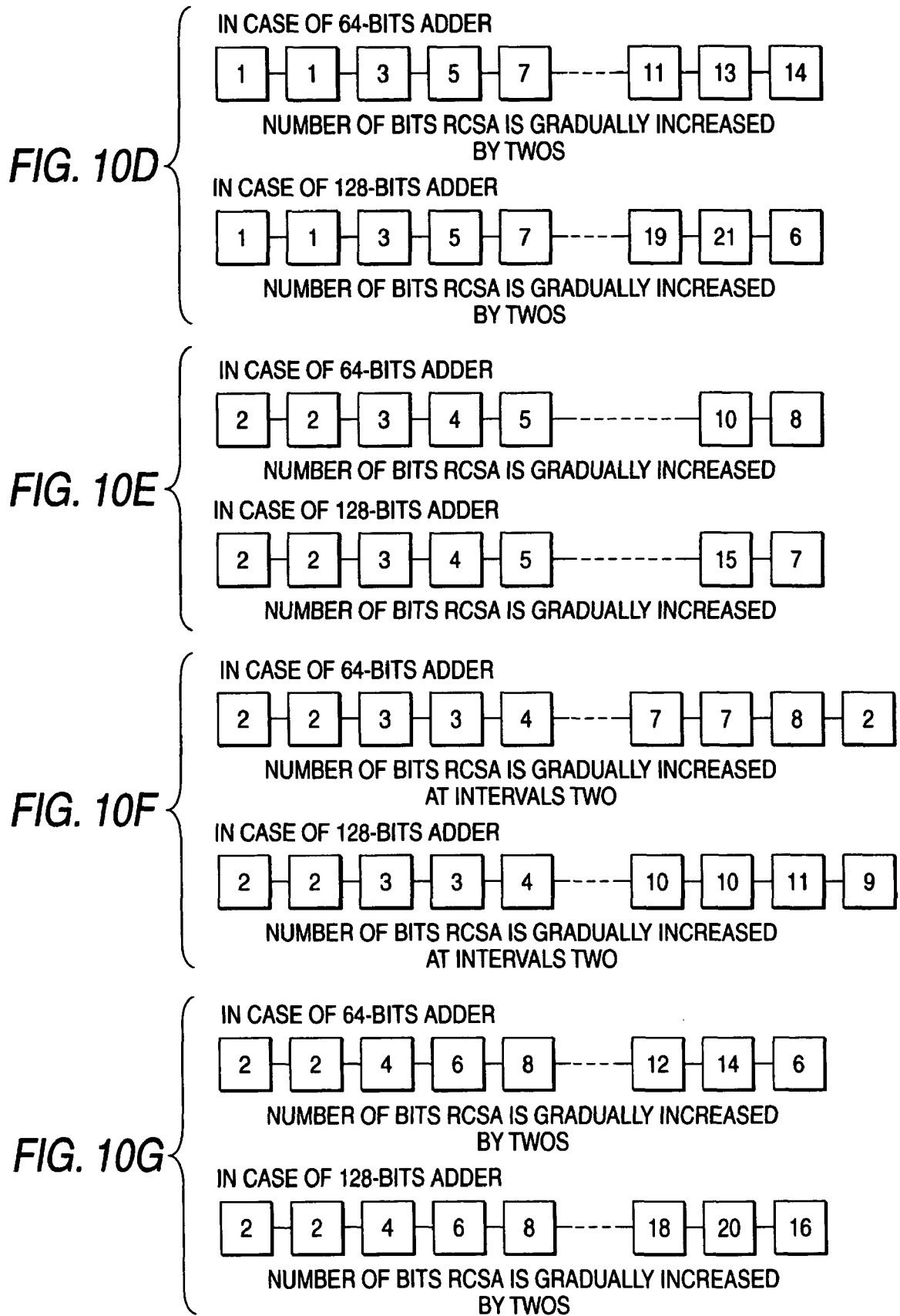

ADDER, MULTIPLIER AND INTEGRATED CIRCUIT

BACKGROUND OF THE INVENTION

The present invention relates to an adder, a multiplier, and an integrated circuit using either of these, and particularly to an adder, a multiplier and an integrated circuit using this, in which a conventional carry-select system is improved to decrease a circuit quantity and to achieve speed-up.

The recent development of DSP (Digital Signal Processing) is remarkable, and a 32-bit multiplier or the like is used as the central technique. As its structure, a simple multiplier using $N^2$ full adders is not adopted, but a second booth multiplier is usually adopted. This is because since the delay of a carry via an adder is large, the number of partial products (booth muxes) is decreased so as to reduce a circuit quantity and to improve a multiplication speed. With respect to the gathering of the booth muxes, although there is a method of using a CPA (Carry Propagation Adder), in view of the delay of the carry, a Wallace tree is usually adopted.

The Wallace tree is configured by a tree structure of CSAs (Carry Save Adder). Since the CSA performs addition with a separate carry, the propagation of the carry does not occur, and the delay of the carry is also small. However, with respect to the gathered booth muxes, since normal addition is performed by a 65-bit adder at the final stage, the delay of the carry at that portion is a bottleneck in speedup of an adder. Besides, also in a 64-bit multiplier, since a 129-bit high speed adder is required, this is an obstacle to realization of the 64-bit multiplier.

This situation is particularly serious in the field of encryption. In order to increase the secrecy of encryption, it is necessary to perform multi-bit addition, subtraction, multiplication and division, and according to circumstances, residue arithmetic is also needed. Today, it is necessary to handle a number of 1024 bits in the encryption of an RSA system, and a number of 224 bits in an elliptic curve cryptosystem. In order to perform encryption or decryption, and further to attach a signature and to perform its verification, such multi-bit calculation must be performed at high speed.

As methods of raising the speed of an adder, various methods are known. Among them, a carry look-ahead adder, a carry-skip adder, and a carry-select adder are well known. In any of these systems, attention is paid to the fact that the delay of a carry via an adder is large, and an idea of raising its speed is adopted. Among these, the "carry-select adder" has not been conventionally adopted very frequently. This is because in this system, the circuit quantity is increased to raise the cost of an LSI, and it is not suitable for a multi-bit adder.

A conventional 4-bit carry-select adder is constituted by a 4-bit adder with a virtual carry $VC_0$ as an input, a 4-bit adder with a virtual carry $VC_1$ as an input, a first multiplexer for selecting respective addition values $S_1$ and $S_2$ of these two 4-bit adders, and a second multiplexer for selecting respective carry outputs $C_1$ and $C_2$ of these two 4-bit adders.

The structures of the two 4-bit adders are not particularly limited, and the above carry look-ahead adder or the like can be adopted. Although the virtual carry $VC_0$ can be determined to be "0" and the virtual carry $VC_1$ can be determined to be "1", the contrary may be adopted.

In this conventional carry-select adder, a true carry input $C_{in}$ is made a selection signal of the first and the second multiplexers, and a true addition value S or carry output $C_{out}$ is selected. In the two 4-bit adders, since 4-bit inputs P and Q are made common, one of the addition values $S_1$ or $S_2$ always becomes the true addition value S, and one of the corresponding carry outputs $C_1$ or $C_2$ becomes the true carry output $C_{out}$.

The conventional carry-select adder of the structure like this has a large merit in calculation speed. When the inputs P and Q are previously determined, in the case where the adders are continuously connected to each other, the calculations are ended substantially at the same time. Thus, thereafter, a true carry has only to be selected, and a calculation time required for addition can be saved. That is, it is unnecessary to consider the propagation of a carry.

However, the conventional carry-select adder requires a circuit quantity two or more times as large as a simple 4-bit adder.

In two full adders used in the conventional carry-select adder, the same input values $P_k$ and $Q_k$ are inputted, and the addition value $S_1$ or $S_2$ and the carry $C_{out1}$ or $C_{out2}$ are respectively outputted. The carry input at the addition is $C_{in1}$ or $C_{in2}$, and correspondingly to the carry output $C_{out1}$ or $C_{out2}$, passages of carries independent from each other are formed. Then, one of the addition values $S_1$ or $S_2$ is selected by a multiplexer in accordance with a carry selection signal $C_s$, and is outputted as an addition value $S_k$. In the conventional carry-select adder like this, since addition values are selected by the multiplexer after addition of the full adders, the circuit is wasteful.

SUMMARY OF THE INVENTION

Then, a first object of the invention is to provide a circuit structure most suitable for multi-bit addition in a multi-bit multiplier or an encryption technique, in which a conventional carry-select adder is improved to decrease a necessary circuit quantity. Besides, a second object of the invention is to provide a higher speed adder by improving a conventional simple carry-select adder.

In order to achieve the first object, the invention adopts a system in which selection of addition values is not performed after respective adders perform addition, and a previously selected carry is used to perform addition, and a common circuit is reduced.

In order to achieve the second object, the invention adopts a new system called "adaptive carry select adder", and achieves high speed addition of multi-bit values.

That is, in order to achieve the above object, according to the invention, an adder having as inputs a first and a second data inputs, a first and a second carry inputs, and a carry selection input comprises a first XOR element for generating an XOR output of the first and the second data inputs, a first multiplexer for selecting one of the first carry input or the first data input while the XOR output is made a selection signal, a second multiplexer for selecting one of the second carry input or the second data input, a third multiplexer for selecting one of the first or the second carry inputs while the carry selection input is made a selection signal, and a second XOR element for generating an XOR output of an output of the third multiplexer and the XOR output, and is characterized in that an output of the first multiplexer is made a first carry output, an output of the second multiplexer is made a second carry output, and an output of the third multiplexer is made an addition value.

By the structure like this, it is possible to obtain the carry-select adder in which the required circuit quantity (the number of gates) is smaller compared to the conventional carry-select adder and the operation speed is high.

Besides, in order to achieve the above object, another adder of the invention comprises plural adders each of which has the above structure and which are continuously connected to each other, wherein a first carry output of a preceding stage is made a first carry input of a subsequent stage, a second carry output of the preceding stage is made a second carry input of the subsequent stage, a carry selection input of the plural adders is made common to all stages, a true carry input of an initial stage adder is made the carry selection input, the first carry input is made a first virtual carry, and the second carry input is made a second virtual carry, and is characterized in that there is provided a fourth multiplexer for selecting one of a first or a second carry outputs of a final stage adder by the carry selection input, and an output of the fourth multiplexer is made a carry output.

In the above structure, a third multiplexer of the initial stage adder is omitted, and instead of an output of the third multiplexer of the initial stage adder, the carry selection input can be used.

Besides, in order to achieve the above object, another adder of the invention is an adder in which plural adders each having any one of the above structures are continuously connected to each other, and a carry output of a preceding stage is made a carry input of a subsequent stage, and which is characterized in that except for a final stage adder, the number of bits which can be processed by an adder of each stage is equal to or larger than the number of bits which can be processed by an adder of a preceding stage.

In the adder of the above structure, it is desirable that except for an initial stage adder, a difference between the number of bits which can be processed by the adder of each stage and the number of bits which can be processed by the adder of the preceding stage is made constant.

Besides, in order to achieve the above object, a booth multiplier of the invention is a booth multiplier configured by a tree structure, and one of the above adders of the plural-stage structure is used as a final stage adder.

BRIEF DESCRIPTION OF THE DRAWINGS

FIGS. 10B to 10G are circuit diagrams exemplifying specific structures of the multi-bit adder according to the second embodiment of the invention.

DETAILED DESCRIPTION OF THE PREFERRED EMBODIMENTS

Hereinafter, embodiments of the invention will be described with reference to the drawings. Incidentally, in the present specification and drawings, structural elements having substantially the same function and structure are denoted by the same symbols and the redundant explanation will be omitted.

Figure 1:
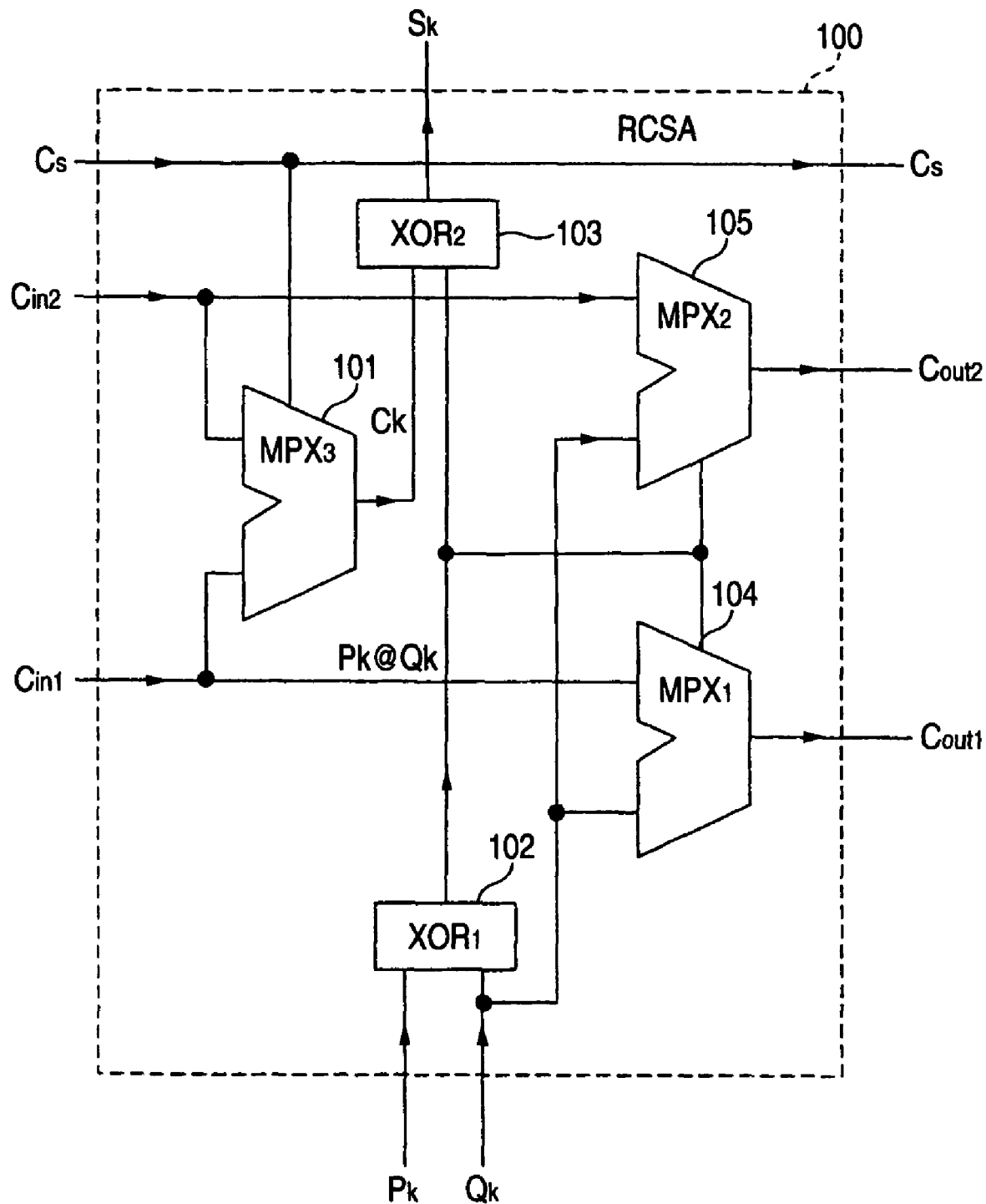
FIG. 1 is a block circuit diagram showing a structure of one bit of a carry-select adder according to a first embodiment of the invention.

FIG. 1 is a block diagram showing a structure of one bit of a carry-select adder according to a first embodiment of the invention. Hereinafter, a structural unit shown in FIG. 1 will be called an RCSA (Reduced Carry Select Adder).

A carry-select adder (RCSA) (100) according to the first embodiment of the invention receives as inputs a first and a second data inputs ($P_k$, $Q_k$), a first and a second carry inputs ($C_{in1}$, $C_{in2}$), and a carry selection input ($C_s$).

The RCSA includes a first XOR element ($XOR_1$) (102) for generating an XOR output ($P_k@Q_k$) of the first and the second data inputs ($P_k$, $Q_k$), a first multiplexer ($MPX_1$) (104) for selecting one of the first carry input ($C_{in1}$) or the first data input ($P_k$) while the XOR output ($P_k@Q_k$) is made a selection signal, a second multiplexer ($MPX_2$) (105) for selecting one of the second carry input ($C_{in2}$) or the second data input ($Q_k$), a third multiplexer ($MPX_3$) (101) for selecting one of the first or the second carry inputs ($C_{in1}$, $C_{in2}$) while the carry selection input ($C_s$) is made a selection signal, and a second XOR element ($XOR_2$) (103) for generating an XOR output of an output ($C_k$) of the third multiplexer ($MPX_3$) (101) and the XOR output ($P_k@Q_k$).

Then, an output of the first multiplexer ($MPX_1$) (104) is made a first carry output ($C_{out1}$), an output of the second multiplexer ($MPX_2$) (105) is made a second carry output ($C_{out2}$), and an output of the third multiplexer ($MPX_3$) (101) is made an addition value ($S_k$) (FIG. 1). Incidentally, the symbol "@" here denotes an XOR (exclusive OR) logical operator.

The carry-select adder RCSA (100) according to the first embodiment of the invention shown in FIG. 1 adopts a system in which a carry is first selected, and then, the selected carry is used to calculate the addition value. As shown in FIG. 1, the exclusive disjunction $P_k@Q_k$ of the input $P_k$ and the input $Q_k$ functions as the carry selection signal of the first multiplexer $MPX_1$ (104) and the second multiplexer $MPX_2$ (105). On the other hand, the third multiplexer $MPX_3$ (101) selects one of the carry inputs $C_{in1}$ or $C_{in2}$, and the carry selection signal $C_s$ is used for the selection.

The selected carry $C_k$, together with the output $P_k@Q_k$, becomes an input to the element $XOR_2$ (103), and the addition value $S_k$ in the bit is outputted. Besides, the first multiplexer $MPX_1$ (104) selects one of the carry input $C_{in1}$ or the input $Q_k$ and outputs the carry $C_{out1}$. The second multiplexer $MPX_2$ (105) selects one of the carry input $C_{in2}$ or the input $Q_k$ and outputs the carry $C_{out2}$.

In the case where consideration is given using logical symbols, in general, the relation between an addition value S and a carry $C_{out}$ is expressed as follows:

$$S = P@Q@C_{in} \qquad \text{expression 1}$$

$$C_{out} = PQ + QC_{in} + PC_{in} \qquad \text{expression 2}$$

However, with respect to $C_{out}$, it is preferable to use not the above expression 2 but the following expression:

$$C_{out}=C_{in}(P@Q)+P(P@Q)\_ \quad \text{expression 3}$$

or $$C_{out}=C_{in}(P@Q)+Q(P@Q)\_ \quad \text{expression 4}$$

Where, the symbol "−" denotes negative logic.

The first reason is that in the expression 2, it is necessary to adopt a 3-input ANDOR logic, and a circuit becomes complicated. The second reason relates to the fact that the exclusive disjunction $P_k@Q_k$ is used as the carry selection signal of the multiplexer $MPX_1$ (104) and the second multiplexer $MPX_2$ (105) of FIG. 1, and in the carry-select adder, since the inputs P and Q are determined prior to the carry $C_{in}$, the system in which selection is performed by the multiplexer is advantageous in speed and circuit quantity. In expressions 1–4, the value S, inputs P and Q correspond to the value $S_k$, inputs $P_k$ and $Q_k$, respectively. Further, carries $C_{in}$ and $C_{out}$ described in the above expressions correspond to carries $C_{in1}$ or $C_{in2}$ and carries $C_{out1}$ and $C_{out2}$ in FIG. 1. In FIG. 1, a carry selection signal $C_s$ is described.

In the case where the circuit of FIG. 1 is actually realized in an LSI, it is known that the circuit quantity can be reduced by using a transmission gate. In the logic using the transmission gate (hereinafter referred to as "TG logic"), the number of gates is small upon visual inspection. However, since the drive performance can be lacking, attention must be paid to the design. For example, it is effective to contrive such means that an inverter is added as the need arises, or the operation is performed in the negative logic.

Figure 2:
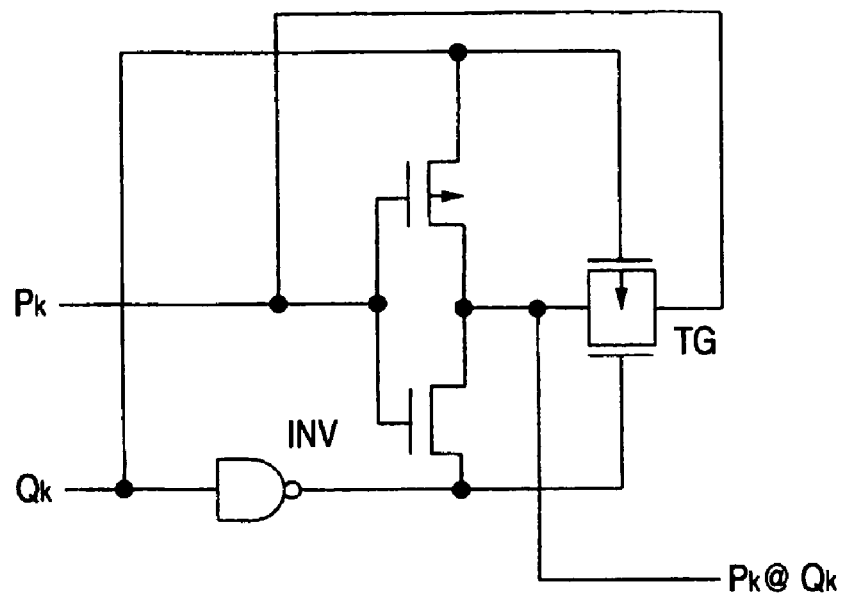
FIG. 2 is an XOR logic circuit by TG logic.

FIG. 2 shows an XOR logic circuit by the TG logic, which can be used in the element $XOR_1$ (102) of FIG. 1. The circuit is constituted by two inverters and one TG, and a source side of one inverter INV is connected to an input $Q_k$ or $Q_{k\_}$, which is different from a normal one. In FIG. 2, a transistor with an arrow in a base is a P-channel MOS, and one without an arrow is an N-channel MOS. It is conceivable that the reason why the number of gates can be reduced by using the TG logic as described above is in the similarity of a transmission gate and a toggle switch. In the circuit of FIG. 2, the first part of the expression 1 and the selection signal $P_k@Q_k$ of the expression 3 or the expression 4 can be calculated.

Figure 3:
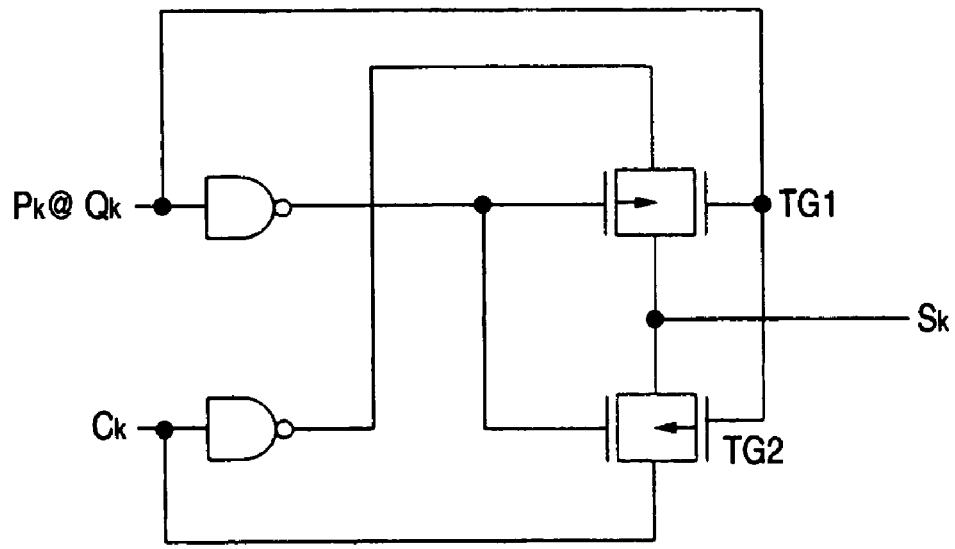
FIG. 3 is an XOR logic circuit by the TG logic.

FIG. 3 shows an XOR logic circuit by the TG logic, which can be used in the element $XOR_2$ (102) of FIG. 1. The circuit is constituted by two inverters and two TGs. Since the carry $C_k$ or $C_k$— is selected by the carry selection signal $P_k@Q_k$, the addition value $S_k$ of the expression 1 can be eventually calculated.

Figure 4:
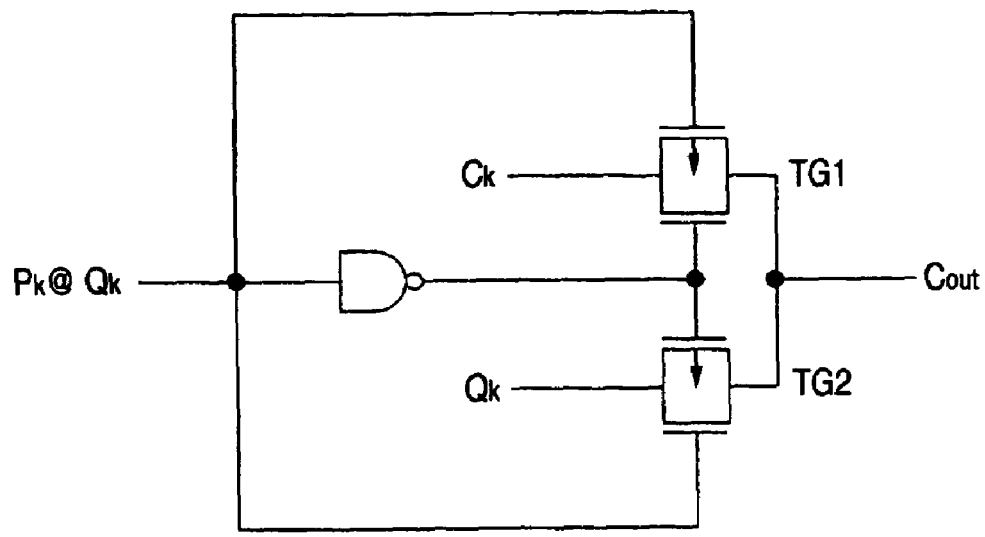
FIG. 4 is a multiplexer by the TG logic.

FIG. 4 shows a multiplexer by the TG logic, which can be used in the multiplexer $MPX_1$ (104) or the multiplexer $MPX_2$ (105) of FIG. 1. In the circuit, the carry input $C_{in1}$ or $Q_k$, or the carry input $C_{in2}$ or $Q_k$ is selected by the carry selection signal $P_k@Q_k$, so that the carry output $C_{out1}$ or $C_{out2}$ by the expression 4 can be calculated. When the input is made not $Q_k$ but $P_k$, it can also be applied to the expression 3.

Figure 5:
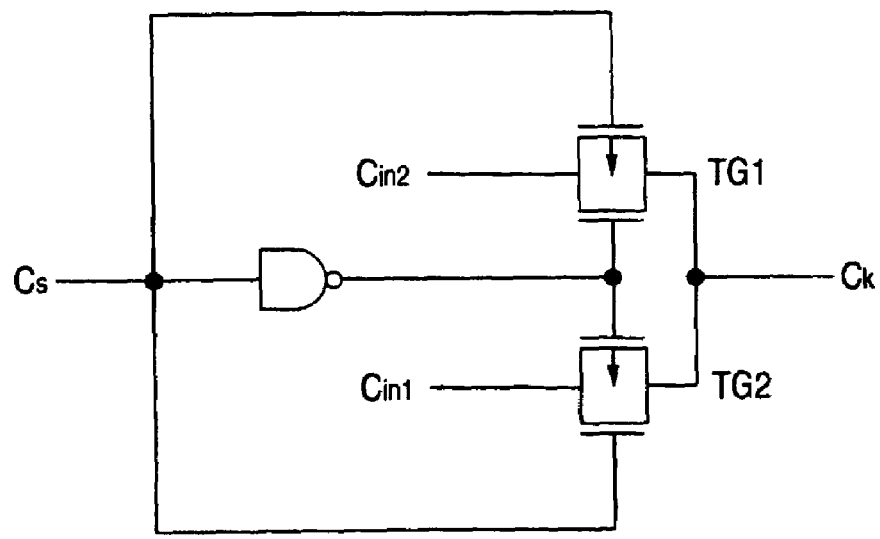
FIG. 5 is a multiplexer by the TG logic.

FIG. 5 shows a multiplexer by the TG logic, which can be used in the third multiplexer $MPX_3$ (101) of FIG. 1. The true carry $C_s$ is used as a carry selection signal, and one of the virtual carry inputs $C_{in1}$ or $C_{in2}$ can be selected as the true carry $C_k$.

In the case where the adder of the circuit structure of FIG. 1 according to the first embodiment of the invention is compared with the adder of the conventional circuit structure, a comparison table when they are simply constituted by the TG logic is shown in Table 1. Since the simple adder can be constituted by 20 gates, the excellence of the TG logic is clear. However, since there is a case where a delay amount is large by wiring capacity and the drive performance is lacking, attention must be paid to the design. As shown in Table 1, although the adder of the conventional circuit structure requires 46 gates, the adder of the circuit structure of FIG. 1 according to the first embodiment of the invention requires merely 32 gates, and the circuit quantity can be reduced by about 30%. Besides, although the 4-bit adder of the conventional circuit structure requires 190 gates, the 4-bit adder of the circuit structure of the first embodiment of the invention requires merely 134 gates, and also in this case, the circuit quantity can be reduced by about 30%.

TABLE 1

|  | Circuit quantity (number of gates) by TG logic |
|---|---|
| Simple adder | 20 |
| Conventional system | 46 |
| System of the invention | 32 |
| 4-bit adder of conventional system | 190 |
| 4-bit adder of the system of the invention | 134 |

In calculation speed, it is important that the delay of only one multiplexer is required from the carry input to the carry output. The fact gives the basis of a second embodiment of the invention described later. In the carry-select adder, since the inputs P and Q are determined prior to the carry $C_{in}$, the carry selection signal P@Q of the multiplexer hardly contributes to the propagation of the carry. According to the TG logic, a carry can be propagated through one adder in the gate delay of only one stage. Even if an inverter is added or the operation is performed in the negative logic, it is sufficiently propagated in the gate delay of two stages.

Figure 6:
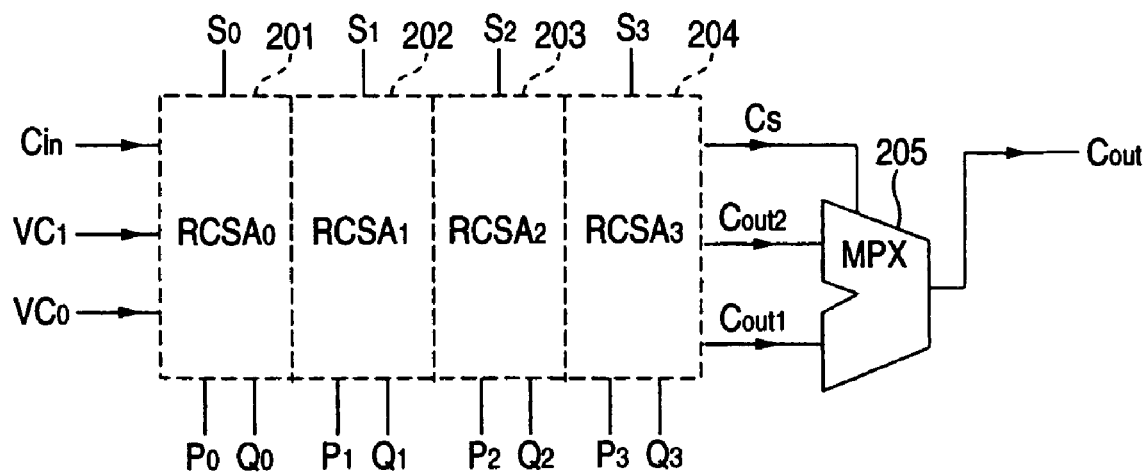
FIG. 6 is a structural view of a 4-bit carry-select adder adopting the RCSA according to the first embodiment of the invention.

A multi-bit adder can be easily configured from the 1-bit circuit of the carry-select adder according to the first embodiment of the invention shown in FIG. 1. FIG. 6 is a structural view of a 4-bit carry-select adder adopting the RCSA (100) according to the first embodiment of the invention. In this adder (204), RCSAs (201 to 204) each of which is based on the first embodiment are continuously connected for 4 bits. In the carry-select adder, since the value of a true carry $C_{in}$ is one of "0" or "1", addition is previously made to proceed by using a virtual carry, and finally, a true carry output $C_{out}$ and addition values $S_0$, $S_2$ or $S_3$ are selected by the true carry input $C_{in}$. In such a structure, the selection of the addition value $S_0$, $S_2$ or $S_3$ is not performed after the addition of those, and the addition using the selected carry $C_k$ is performed, which is different from a conventional example. This uses the condition that the calculation of an addition value may be slow as compared with the generation of a carry.

In FIG. 6, an $RCSA_0$ (201), an $RCSA_1$ (202), an $RCSA_2$ (203) and an $RCSA_3$ (204) are simple carry-select adders each having the structure of FIG. 1 according to the embodiment of the invention, and the $RCSA_0$ to the $RCSA_3$ (201 to 204) are continuously connected in sequence. In this adder, a virtual carry is determined, a tentative carry output $C_{out1}$ or $C_{out2}$ is calculated, and the true carry output $C_{out}$ is selected in a multiplexer MPX (205) by using a carry selection signal $C_s$ as the true carry input $C_{in}$. Incidentally, in the initial stage adder $RCSA_0$ (201), the third multiplexer MPX$_3$ (101) of FIG. 1 is omitted, and the true carry input C$_{in}$ can be directly made the carry C$_k$ after selection. Besides, although the virtual carry VC$_0$ is determined to be a value "0", and the virtual carry VC$_1$ is determined to be a value "1", the opposite may be adopted. When the values of the virtual carries VC$_0$ and VC$_1$ are reversed, in the multiplexer MPX (205), the selection reverse to the above has only to be performed.

Figure 7:
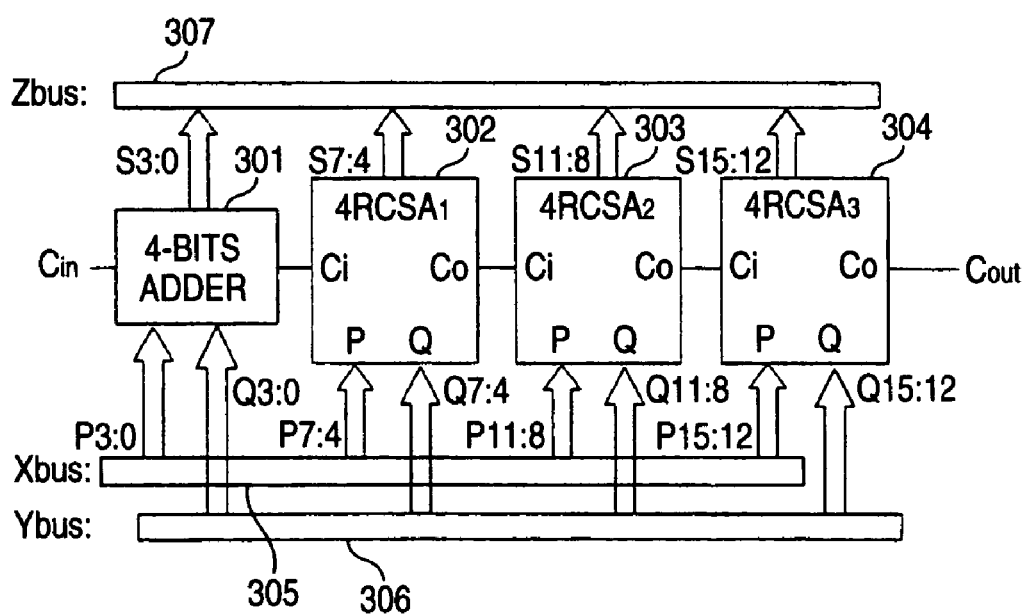
FIG. 7 is a circuit structural view of a 16-bit carry-select adder adopting the 4-bit adder according to the first embodiment of the invention.

FIG. 7 shows an embodiment of a 16-bit carry-select adder adopting the 4-bit adder according to the first embodiment of the invention. As shown in FIG. 7, in this adder, the 16-bit carry-select adder is configured by continuously connecting the 4-bit carry-select adders (4-RCSA) of FIG. 6. In this embodiment, the 4-RCSAs of only three stages are continuous, and the initial stage uses a normal 4-bit adder (301). This embodiment shows a kind of parallel operation by the 4-bit adders, and since the initial stage adder does not require a carry selection circuit, a means of reducing the circuit quantity is contrived. Accordingly, the system of the 4-bit adder (301) is not particularly limited, and a normal CPA, a carry look-ahead adder, or a carry-skip adder may be used.

In the 4-bit adder (301), a 4-bit input P3:0 (indicating an input of from 0 bit to 3 bit. The same applies in the following) from an Xbus (305) and a 4-bit input Q3:0 from a Ybus (306) are added by receiving a carry input C$_{in}$, and a 4-bit output S3:0 as an addition value and a carry are outputted. The outputted carry becomes a carry input of a next stage adder 4-RCSA$_1$ (302). The next stage adder 4-RCSA$_1$ (302) is the carry-select adder of FIG. 6, adds a 4-bit input P7:4 from the Xbus (305) and a 4-bit input Q7:4 from the Ybus (306) by receiving the carry input C$_i$, and outputs a 4-bit output S7:4 as an addition value and a carry C$_0$. This carry C$_0$ becomes a carry input of a third stage adder 4-RCSA$_1$ (303).

The third stage adder 4-RCSA$_2$ (303) is the carry-select adder of FIG. 6, adds a 4-bit input P11:8 from the Xbus (305) and a 4-bit input Q11:8 from the Ybus (306) by receiving the carry input C$_i$, and outputs a 4-bit output S11:8 as an addition value and a carry C$_0$. This carry C$_0$ becomes a carry input of a third stage adder 4-RCSA$_2$ (303). The fourth stage adder 4-RCSA$_3$ (304) is the carry-select adder of FIG. 6, adds a 4-bit input P15:12 from the Xbus (305) and a 4-bit input Q15:12 from the Ybus (306) by receiving the carry input C$_i$, and outputs a 4-bit output S15:12 as an addition value and a carry output C$_{out}$.

Figure 8:
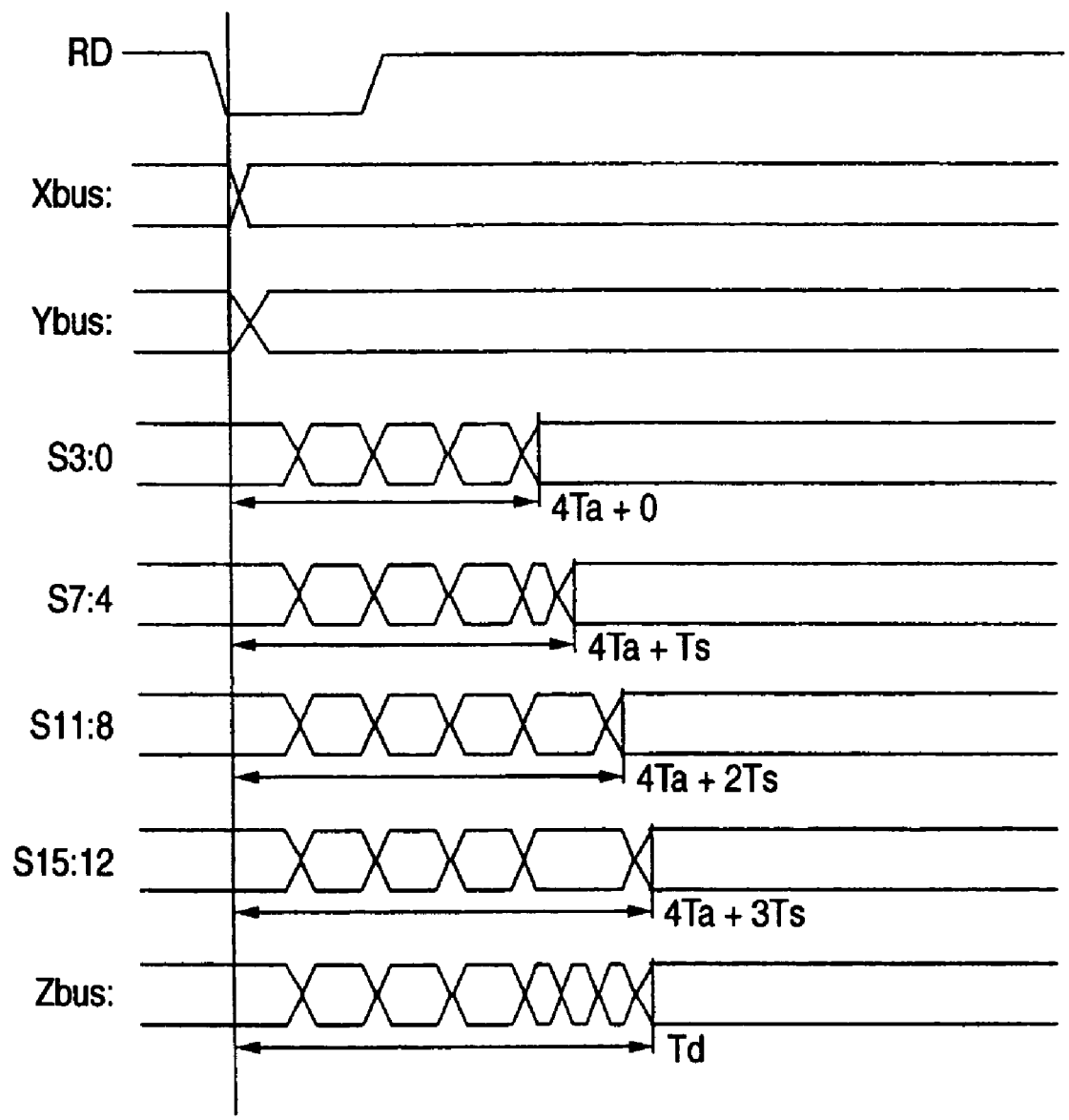
FIG. 8 is a time chart displaying a delay time in the form of waveform change of output terminals or the like, for explaining the operation of a 16-bit adder using the carry-select adder shown in FIG. 7.

FIG. 8 is a time chart showing a delay time in the form of waveform change of output terminals or the like, for explaining the operation of the 16-bit adder using the carry-select adder according to the embodiment of the invention shown in FIG. 7. In FIG. 8, data of the Xbus and the Ybus is determined by an RD_signal, and by the change until the addition result appears on a Zbus after a delay time Td, the high speed property of the carry-select adder according to the embodiment is expressed. In the case where a delay time of an addition carry is Ta in FIG. 8, with respect to the output S3:0 (indicating an output of from 0 bit to 3 bit. The same applies in the following) of the 4-bit adder 4-RCSA$_0$ (301), the addition is ended in a delay time 4Ta. Besides, in the case where a delay time of a selection carry in a multiplexer is made Ts, with respect to the output S7:4 of the adder 4-RCSA$_1$ (302), the addition is ended in a delay time 4Ta+Ts. Besides, with respect to the output S11:8 of the adder 4-RCSA$_2$ (303), the addition is ended in a delay time 4Ta+2Ts. Besides, with respect to the output S15:12 of the adder 4-RCSA$_3$ (304), the addition is ended in a delay time 4Ta+3Ts. Accordingly, the delay time Td in which the addition result appears on the Zbus is at most about 4Ta+3Ts. Incidentally, an addition time of an output of a normal 16-bit adder is 16 Ta.

The point of this embodiment is that after data is determined, the four adders (301 to 304) can start addition simultaneously by the virtual carries. Such becomes possible and consequently, although a time required for the addition of 4 bits is taken, thereafter, it has a merit that addition of values having a large digit number can be executed only in the delay time Ts in which the selection carry passes through the multiplexer. In this embodiment, it is also possible to understand that a carry is propagated on a multiplexer, not an adder.

As described above, according to the first embodiment of the invention, by the simple carry-select adder of the RCSA, the circuit quantity can be reduced by about 30% as compared with the conventional carry-select adder. In the aspect of calculation speed, it takes only a delay of one stage of a multiplexer to advance from a carry input to a carry output.

(Second Embodiment)

A second embodiment of the invention relates to a new system called an adaptive carry-select adder in the present specification. This system is based on the fact that a delay time Ts of a multiplexer (for example, the MPX of FIG. 6) using a carry selection signal C$_s$ and a carry delay time Ta of a carry-select adder according to the embodiment are substantially equal to each other. A carry (hereinafter referred to as an addition carry) passing through an adder has a delay (Ta) of one stage of the first multiplexer MPX$_1$ or the second multiplexer MPX$_2$ of FIG. 1, the carry selection signal C$_s$ has a delay (Ts) of one stage of the multiplexer MPX of FIG. 6, and Ta and Ts are substantially equal to each other. From this, the multi-bit addition uses the fact that even if the number of bits of a next stage carry-select adder is increased, a delay time of carry generation dose not change. Although this delay time is not changed, since the number of processable bits can be gradually increased, the total addition time is shortened.

Figure 9:
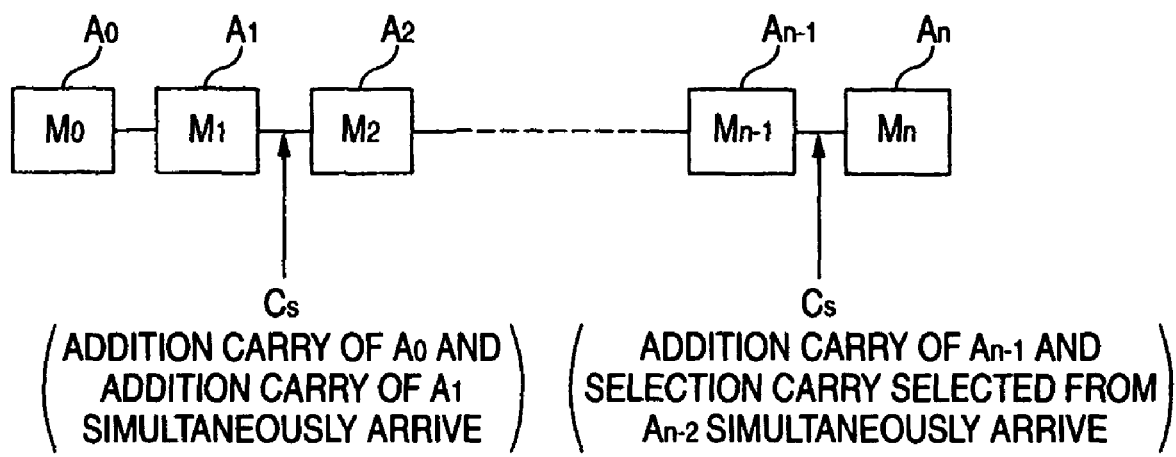
FIG. 9 is a circuit structural view of a multi-bit adder according to a second embodiment of the invention.

FIG. 9 shows a circuit structure of a multi-bit adder according to the second embodiment of the invention. This adder is characterized in that it is configured by the above adaptive carry-select system. In this adder, adders (A$_0$ to A$_n$) of the first embodiment are continuously connected. A first carry output of a preceding stage is made a first carry input of a subsequent stage, a second carry output of the preceding stage is made a second carry input of the subsequent stage, and a carry selection input of the plural adders is made common to all stages. A true carry input of an initial stage adder is made a carry selection input, a first carry input is made a first virtual carry, a second carry input is made a second virtual carry, and there is provided a fourth multiplexer for selecting one of a first or a second carry outputs of a final stage adder by the carry selection input. An output of the fourth multiplexer is made a carry output. Incidentally, a third multiplexer of the initial stage adder is omitted, and instead of an output of the third multiplexer of the initial stage adder, the carry selection input is used.

In FIG. 9, an initial stage M$_o$-bit adder A$_0$ includes the RCSA according to the first embodiment. All of a next stage M$_1$-bit adder A$_1$ to a final stage M$_n$-bit adder A$_n$ are also constituted by the RCSAs according to the first embodiment.

Accordingly, in the case where an N-bit adder is an object, $$N = \Sigma M_k (k=0, \ldots, n)$$ expression 5

However, the number of bits M$_n$ of the final stage adder A$_n$ is not necessarily larger than the number of bits of the preceding stage. This is because if the number N is not a suitable value, $M_n$ generally becomes a fraction.

Here, in case of $M_1=M_0$, carries of the adders $A_0$ and $A_1$ can be inputted to the first multiplexer substantially at the same time. This means optimization at the input side. Besides, in the adder $A_{n-1}$ just before the final stage adder, if a carry via an adder and a carry select signal can be simultaneously inputted to the multiplexer at the output side, the total addition time (Tt) can be optimized. This means optimization at the output side, and can be differentiated from the optimization at the input side. The reason why the final stage adder $A_n$ is not made an object is that the number $M_n$ of bits generally becomes a fraction.

A delay Td of the selection carry, that is, the carry select signal $C_s$ up to the adder $A_{n-1}$ is given by $$Td = M_o Ta + (n-2)Ts \qquad \text{expression 6}$$

On the other hand, if the delay of the addition carry via the adder $A_{n-1}$ is identical to Td, the optimization at the output side can be achieved, and Td is given by $$Td = M_{n-1} \cdot Ta \qquad \text{expression 7}$$

Incidentally, the total addition time Tt is $$Tt = Td + 2Ts \qquad \text{expression 8}$$

In the second embodiment, an attempt is made to constitute the number of bits of the adders, which is gradually increased, by an arithmetic progression. Then, in the case where a common difference is h bits, it can be expressed as follows:

$$M_k = M_o + h(k-1) \ (k=1, \ldots, n-1) \qquad \text{expression 9}$$

The common difference h is obtained from the expression 6 and the expression 7 as follows:

$$h = Ts/Ta \qquad \text{expression 10}$$

Then, from the expression 5 and the expression 9, n is $$n = \{-(2M_o - 3h) + \sqrt{\{(2M_o - 3h)^2 + 8h(N - M_n - h)\}}\}/2h \qquad \text{expression 11}$$

Besides, when a calculation is performed to find the way of determining the initial value $M_o$ so as to minimize the total addition time Tt, $$M_o = 3h/2, \qquad \text{expression 12}$$

and the number n of multiplexers for selecting the carry is obtained as follows:

$$n = \sqrt{\{2(N - M_n - h)/h\}} \qquad \text{expression 13}$$

Then, by using n of the expression 13, the minimum value (Tt)min of Tt is given by $$(Tt)\text{min} = (n + 3/2)h \cdot Ta \qquad \text{expression 14}$$

Since the common difference h is given by the expression 10, on the basis of the above consideration, it is possible to estimate that its value is close to 1. In the case where the RCSA according to the first embodiment is adopted, since the fan-out of the selection carry is large, the delay time Ts of the selection carry can be larger than the delay time Ta of the addition carry. Accordingly, the common difference h is close to 1 and can become a number larger than 1. However, in the case where the RCSA according to the first embodiment is not adopted, the addition carry is normally slower than the selection carry, and accordingly, h normally becomes smaller than 1.

In an actual circuit, it is not impossible to always determine the variable to minimize the total addition time Tt. The variable h must adopt an integer or the inverse of an integer, such as 1, 2 or 0.5, and the number $M_o$ of bits of the initial stage adder $A_o$ must be an integer. Accordingly, the best design along the above optimization becomes necessary.

FIGS. 10B to 10G exemplify specific structures of multibit adders according to the embodiment. FIG. 10A exemplifies a conventional configuration method of a 64-bit adder and a 128-bit adder. Here, 4-bit adders are simply continuously connected, and a true carry is selected at each time. In this system, since a delay time of a selection carry is simply added, there is much waste.

Figure 10A:
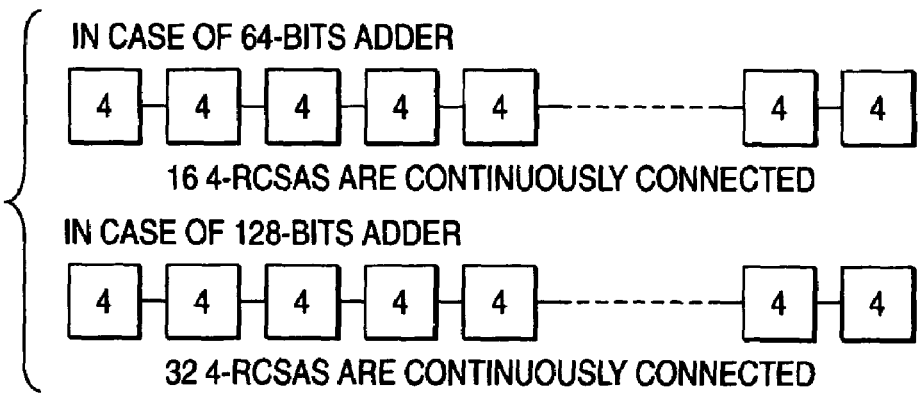
FIG. 10A is a circuit diagram showing a conventional structure.
Figure 10B:
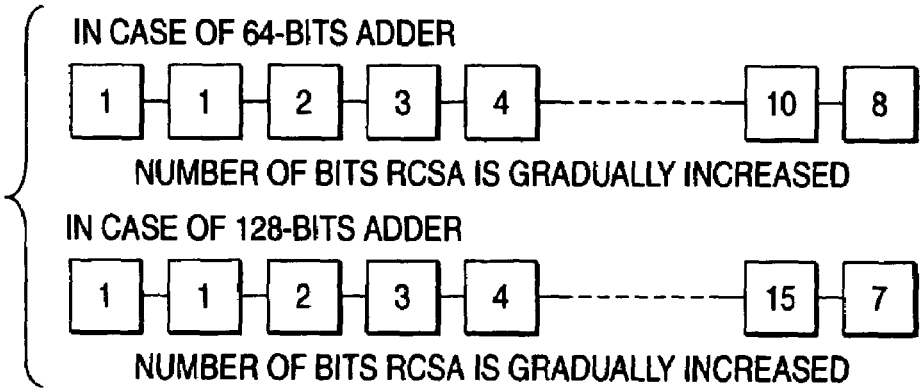

FIG. 10B shows the second embodiment of the invention and a case of an initial value $M_o=1$ and a common difference h=1. Since the initial value is $M_o=1$, an initial stage adder $A_o$ has 1 bit, and a next stage adder $A_1$ also has 1 bit. Hereinafter, a structure in which the number of bits of an adder is increased by a common difference of 1 is adopted. In case of a 64-bit adder (N=64), because of n=10.7, $A_{10}$ is a 10-bit adder, and a final adder $A_{11}$ has a fractional bit $M_n=8$. In case of a 128-bit adder (N=128), because of n=15.4, $A_{15}$ is a 15-bit adder, and a final adder $A_{16}$ has a fractional bit Mn=7. Since $M_n$ is not determined from the first, n can not be actually obtained from the expression 11, and an approximate value of n can be merely known. In order to actually obtain $M_n$, after n is obtained, a recalculation is performed by the expression 5.

Figure 10C:
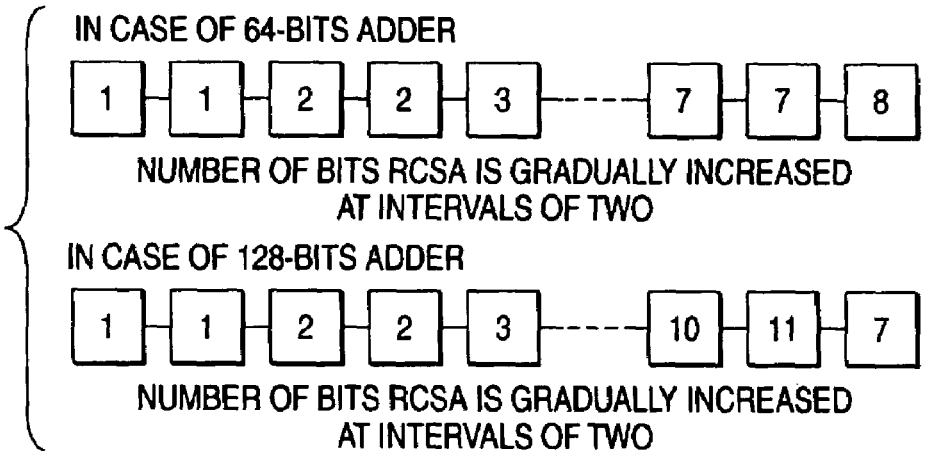
Figure 11:
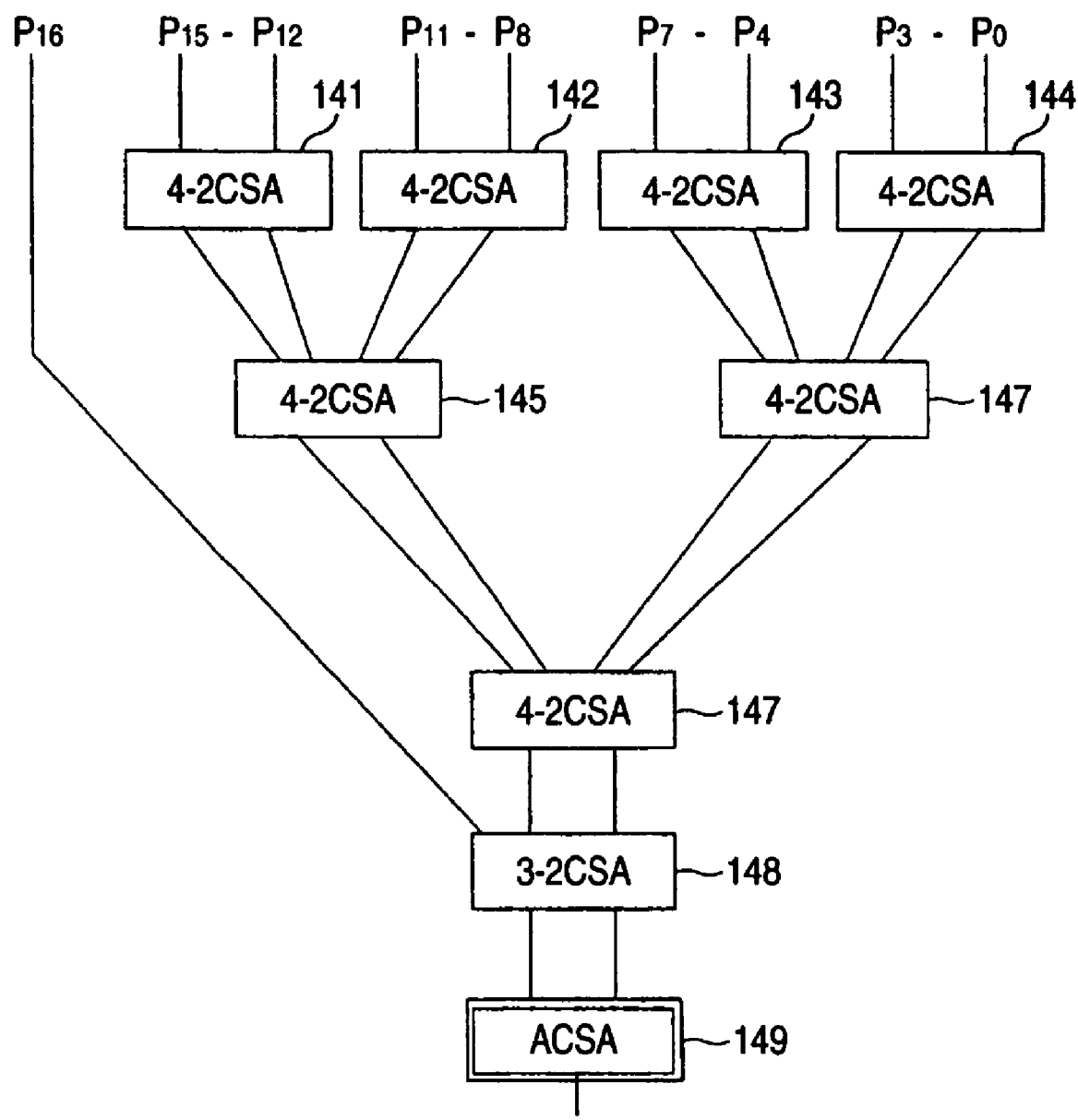
FIG. 11 is a structural view showing an example of a 32-bit booth multiplier according to a third embodiment of the invention.

FIG. 10C shows the second embodiment of the invention and a case of an initial value $M_o=1$ and a common difference h=0.5. In order to realize a common difference h=0.5, the number of bits of an adder is increased by 1 bit at intervals of two adders. In case of a common difference of ½, in a multiplexer of a third adder $A_2$ at an output side, an addition carry of an adder $A_2$ becomes slower than a selection carry, and the same situation applies to a latter stage adder. Then, when the total calculation time Tt is obtained, in the case where a fraction Mn occurs, a calculation is performed on the basis of the delay time of an adder $A_{n-1}$, and the value is $M_{n-1} \cdot T_a + 2Ts$. Fortunately, in the carry-select adder, accumulation of delay times does not occur. That is, since it is a kind of parallel calculation, a delay occurring in preceding stage calculation is not added to a subsequent stage calculation time.

FIG. 10D shows the second embodiment of the invention and a case of an initial value $M_o=1$ and a common difference h=2. As long as the structure of this embodiment is adopted, there hardly occurs such a situation that a common difference is h=2, that is, a selection carry is twice as slow as an addition carry. However, the fan-out of the carry selection signal $C_s$ is large, and a long wiring line is imaginable, it can not be said that such a situation does not occur at all. Here, it is exemplified for comparison.

FIG. 10E shows the second embodiment of the invention and a case of an initial value $M_o=2$ and a common difference h=1. As described above, the value of the initial value $M_o$ for minimizing the total addition time Tt is given by the expression 12, and in case of the common difference h=1, it is most suitable to make $M_o=1.5$. However, since $M_o$ must be selected to be an integer, the design of the initial value $M_o=2$ can also be adopted. As compared with the case of $M_o=1$ of FIG. 10B, the total addition time Tt is substantially the same. The same applies in FIG. 10F and FIG. 10G. In Table 2, with respect to the total addition time Tt, for example, in case of h=1, a difference between a theoretical optimum value and a best design value is 1% or less, and the effectiveness of such design is exhibited.

Table 2 enumerates values of the total addition time Tt of the second embodiment of the invention shown in FIGS. 10B to 10G. As compared with the conventional example of FIG. 10A, the total addition time Tt can be decreased by about 40% in the 64-bit adder, and about 50% in the 128-bit adder. Of course, as compared with the normal CPA, it is remarkably fast. The total addition time Tt is approximately a delay time of an addition carry of an adder $A_{n-1}$ just before the final stage, and more accurately, in case of h=1, the ratio to the total addition time of the CPA is about $N/(M_{n-1}-2)$. This value is about 8 times in the 64-bit adder, and about 10 times in the 128-bit adder.

TABLE 2

| Configuration method of adder | $M_o$ | h | Total addition time (Tt/Ta) 64 bits | 128 bits | Remarks |
|---|---|---|---|---|---|
| FIG. 10A | 4 | 0 | 4 Ta + 15 Ts | 4 Ta + 31 Ts | Conventional example |
| FIG. 10C | 1 | 1/2 | 8 Ta + Ts (8.5) | 11 Ta + 2 Ts (12) | Present invention |
| FIG. 10B | 1 | 1 | Ta + 11 Ts (12) | Ta + 16 Ts (17) | " |
| FIG. 10D | 1 | 2 | Ta + 8 Ts (17) | Ta + 12 Ts (25) | " |
| FIG. 10F | 2 | 1/2 | 8 Ta + 2 Ts (9) | 11 Ta + 2 Ts (12) | " |
| FIG. 10E | 2 | 1 | 2 Ta + 10 Ts (12) | 2 Ta + 15 Ts (17) | " |
| FIG. 10G | 2 | 2 | 2 Ts + 8 Ts (18) | 2 Ta + 11 Ts (24) | " |
| Theoretical optimum value | 3/2 h | h | 1.5 Ta + 10.5 Ts (12.0) | 1.5 Ta + 15.5 Ts (17.0) | assumed to be h = 1 |

In Table 2, in case of a common difference h=½, in the multiplexer of the third adder $A_2$ at the output side, the addition carry of the adder $A_2$ is slower than the selection carry. The same situation applies to a latter stage adder.

In the aspect of circuit quantity, as compared with the conventional example of FIG. 10A, although the total number N of bits of the adders is the same, the number of multiplexers required for the selection of carries can be decreased. Specifically, the number can be decreased by about 4 in the 64-bit adder, and about 15 in the 128-bit adder.

As described above, according to the second embodiment of the invention, the new system called the adaptive carry-select system in the present specification is adopted, the high speed addition of multi-bit values can be achieved, and the circuit quantity can be reduced.

(Third Embodiment)

FIG. 12 is a block circuit diagram showing a structure of a third embodiment in which the adaptive carry-select system of the second embodiment of the invention is applied to a 32-bit booth multiplier. In FIG. 12, a Wallace tree of a second booth multiplier is constituted by CSAs (Carry Save Adder). The 17 values of $P_{16}$ to $P_0$ are partial products of the second booth multiplier, and each is constituted by 33 bits. A 3-2CSA (148) is a CSA which can combine three numerical values into two, and by this, numerical values required for the addition are reduced. Besides, 4-2CSAs (141, 142, 143, 144, 145, 146, 147) are CSAs each of which can combine four numerical values into two, and is constituted by continuously connecting the 3-2CSAs.

In the Wallace tree of a normal second booth multiplier, not an ACSA (149) but a CPA (Carry Propagation Adder) is used at a position of a final stage adder, and addition of two numerical values is performed. This CPA is for adding finally remaining two 64-bit values and has a 65-bit structure. A large delay occurs in propagation of a carry only in this CPA, and this has been a bottleneck in the speedup of a multiplier. The third embodiment adopts the adaptive carry-select adder (ACSA) instead of this CPA, and remarkably contributes to the speedup of the 32-bit multiplier. Incidentally, also in the case where the most significant bit (MSB) of a 32-bit value is encoded by two's compliment display, the same applies.

In the case where a future 64-bit multiplier is considered, high speed addition of multi-bit values is becoming an indispensable technique, and the high speed multiplier adopting the ACSA according to the third embodiment of the invention exhibits an effect exceeding mere replacement of a structural element. For example, in the case where the 64-bit multiplier is constituted by the second booth multiplier, the ACSA (149) processes a multi-bit value about two times as large as that of the case of the 32-bit multiplier. In the case where this is constituted by the conventional CPA, a delay time of a carry becomes a large obstacle to the speedup of the multiplier, and the meaning of adopting the 64-bit multiplier may be lost.

As described above, by the application of the second booth multiplier to the Wallace tree, the third embodiment of the invention can remarkably contribute to the speedup of the multiplier.

Incidentally, it is needless to say that the adder and the multiplier of the embodiment described above exhibit the effects even when they are incorporated as part of an integrated circuit, not to mention a case where they are separately used.

In the above, although the preferable embodiments of the adder and the multiplier of the invention, and the integrated circuit using this have been described with reference to the drawings, the invention is not limited to these embodiments.

One skilled in the art can consider various modified examples and corrected examples within the scope of the technical concept recited in the claims, and it should be understood that those naturally belong to the technical scope of the invention.

According to the invention, the conventional carry-select adder is improved, and it is possible to provide the circuit structure of the adder and the multiplier, which is most suitable for multi-bit addition in a multi-bit multiplier or an encryption technique, reduces a circuit quantity, and achieves a speedup.

What is claimed is:

1. An adder having as inputs a first and a second data input, a first and a second carry input, and a carry selection input, comprising:
   a first XOR element for generating an XOR output of the first and second data inputs;
   a first multiplexer for selecting one of the first carry input or the first data input while the XOR output is made a selection signal;
   a second multiplexer for selecting one of the second carry input or the second data input;
   a third multiplexer for selecting one of the first or second carry inputs while the carry selection input is made a selection signal; and
   a second XOR element for generating an XOR output of an output of the third multiplexer and the XOR output, wherein
   an output of the first multiplexer is made a first carry output,
   an output of the second multiplexer is made a second carry output, and
   an output of the third multiplexer is made an addition value.

2. An adder comprising plural adders each of which is recited in claim 1 and which are continuously connected to each other, wherein:
   a first carry output of a preceding stage is made a carry input of a subsequent stage;
   a second carry output of the preceding stage is made a second carry input of the subsequent stage;
   a carry selection input of the plural adders is made common to all stages;
   a true carry input of an initial stage adder is made the carry selection input, the first carry input is made a first virtual carry, and the second carry input is made a second virtual carry;
   the adder further comprises a fourth multiplexer for selecting one of a first or a second carry outputs of a final stage adder by the carry selection input; and
   an output of the fourth multiplexer is made a carry output.

3. An adder according to claim 2, wherein the third multiplexer of the initial stage adder is omitted, and instead of an output of the third multiplexer of the initial stage adder, the carry selection input is used.

4. An adder comprising plural adders each of which is recited in claim 3 and which are continuously connected to each other, wherein
   a carry output of a preceding stage is made a carry input of a subsequent stage, and
   except for a final stage adder, a number of bits which can be processed by an adder of each stage is equal to or larger than a number of bits which can be processed by an adder of a preceding stage.

5. An adder according to claim 4, wherein except for an initial stage adder, a difference between the number of bits which can be processed by the adder of each stage and the number of bits which can be processed by the adder of the preceding stage is made constant.

6. A booth multiplier configured by a tree structure, wherein an adder of claim 4 is used as a final stage adder.

7. An adder comprising plural adders each of which is recited in claim 2 and which are continuously connected to each other, wherein
   a carry output of a preceding stage is made a carry input of a subsequent stage, and
   except for a final stage adder, a number of bits which can be processed by an adder of each stage is equal to or larger than a number of bits which can be processed by an adder of a preceding stage.

8. An adder according to claim 7, wherein except for an initial stage adder, a difference between the number of bits which can be processed by the adder of each stage and the number of bits which can be processed by the adder of the preceding stage is made constant.

9. A booth multiplier configured by a tree structure, wherein an adder of claim 7 is used as a final stage adder.

* * * * *